April 23, 1929.    C. F. SMITH    1,710,246
PAPER CUP MACHINE
Filed July 7, 1927    10 Sheets-Sheet 3
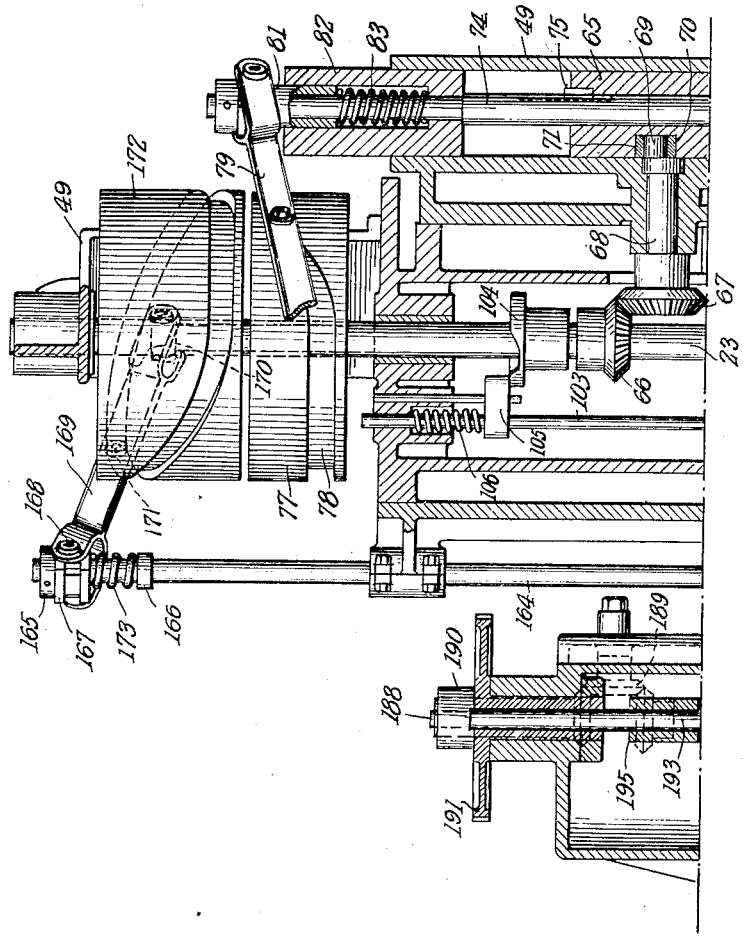
Fig. 2ª.
INVENTOR.
Charles F. Smith
BY Wilbur M. Stone
his ATTORNEY April 23, 1929.  C. F. SMITH  1,710,246
PAPER CUP MACHINE
Filed July 7, 1927  10 Sheets-Sheet 4

INVENTOR.
Charles F. Smith
BY Wilbur M. Stone
his ATTORNEY.

April 23, 1929.  C. F. SMITH  1,710,246
PAPER CUP MACHINE
Filed July 7, 1927   10 Sheets-Sheet 5

INVENTOR.
Charles F. Smith
BY Wilbur M. Stone
his ATTORNEY

April 23, 1929. C. F. SMITH 1,710,246
PAPER CUP MACHINE
Filed July 7, 1927 10 Sheets-Sheet 6

INVENTOR.
BY Charles F. Smith
Wilbur M. Stone
his ATTORNEYS.

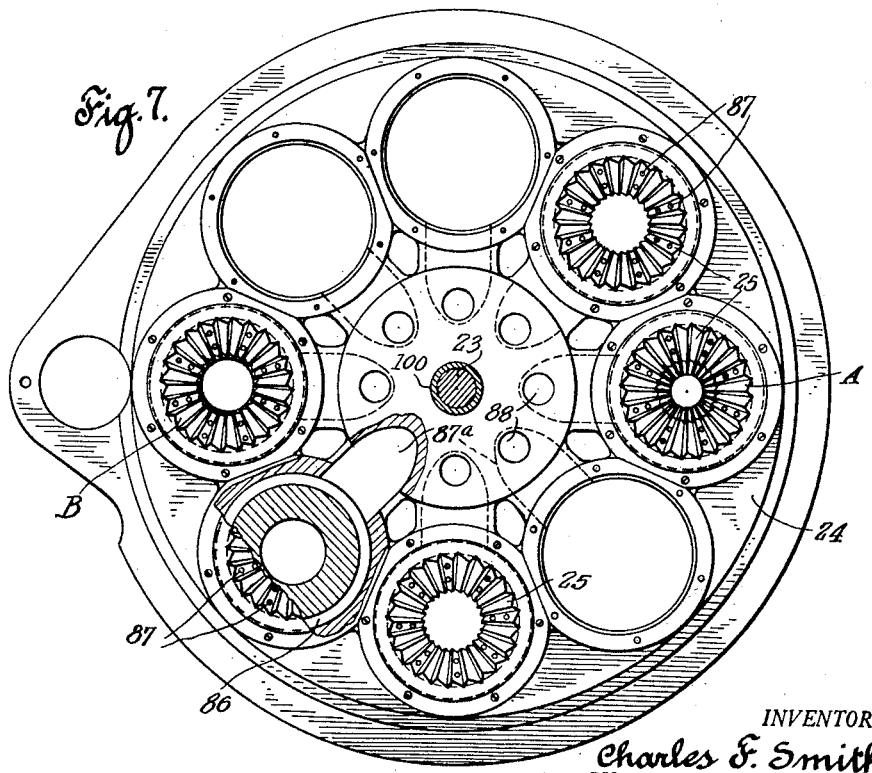

April 23, 1929.   C. F. SMITH   1,710,246
PAPER CUP MACHINE
Filed July 7, 1927   10 Sheets-Sheet 8

INVENTOR.
Charles F. Smith
BY Wilbur M. Stone
his ATTORNEY

April 23, 1929.   C. F. SMITH   1,710,246
PAPER CUP MACHINE
Filed July 7, 1927   10 Sheets-Sheet 9

INVENTOR.
Charles F. Smith
BY Wilbur M. Stone
his ATTORNEY

April 23, 1929.　　　　C. F. SMITH　　　　1,710,246
PAPER CUP MACHINE
Filed July 7, 1927　　　10 Sheets-Sheet 10

INVENTOR.
Charles F. Smith
BY Wilbur M. Stone
his ATTORNEY

Patented Apr. 23, 1929.

1,710,246

UNITED STATES PATENT OFFICE.

CHARLES F. SMITH, OF BROOKLYN, NEW YORK, ASSIGNOR TO PUBLIC SERVICE CUP COMPANY, OF BROOKLYN, NEW YORK, A CORPORATION OF NEW YORK.

PAPER-CUP MACHINE.

Application filed July 7, 1927. Serial No. 204,023.

This invention relates to paper cup machines, particularly to machines for making from a continuous strip of paper or the like cups or containers having plaited side walls with a turned over top edge. The object of my improvements is to provide a machine of the character specified, which will produce completed cups with speed and accuracy and with a minimum of attention by an operative.

Figure 1:
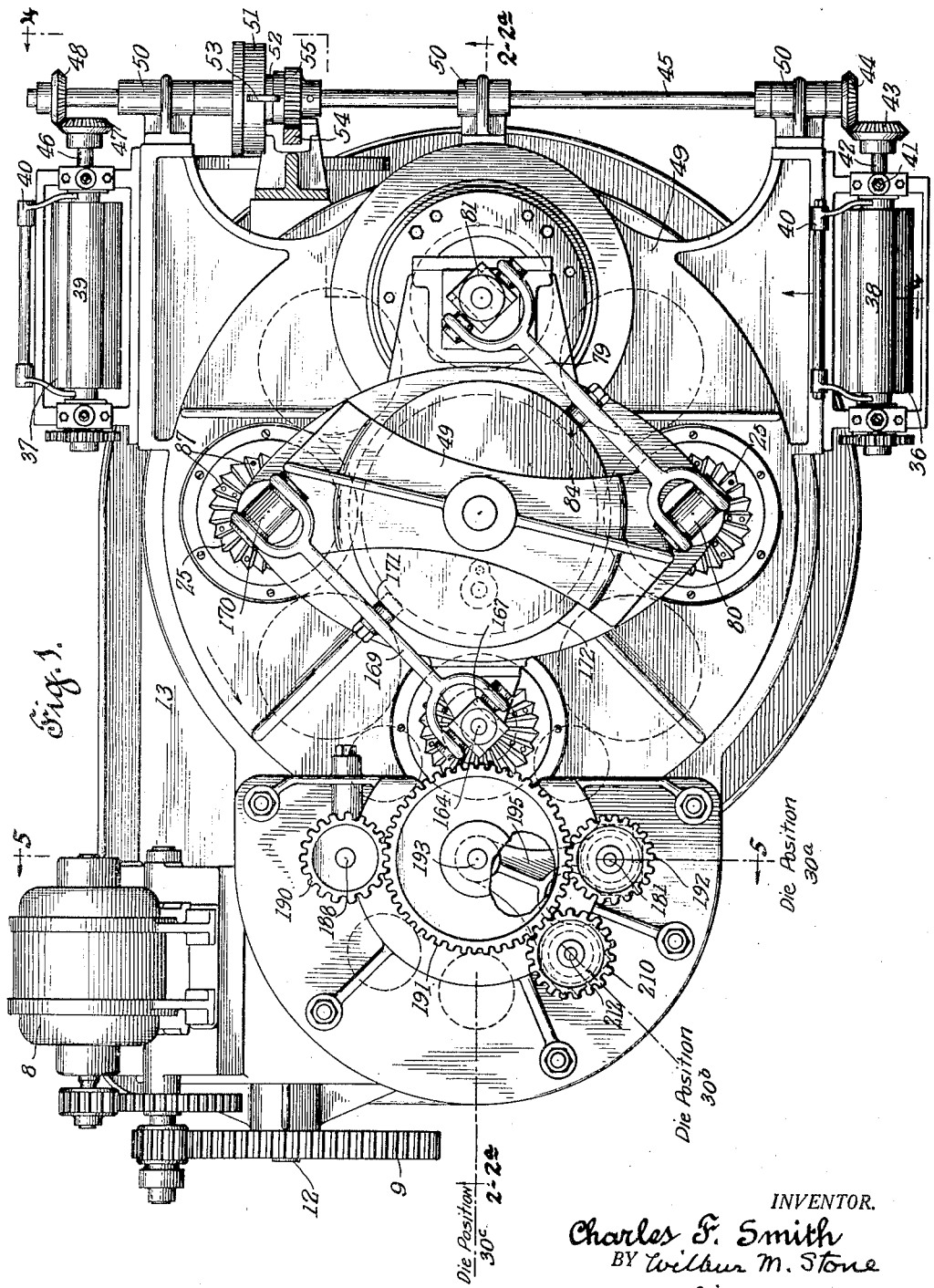
Figure 2:
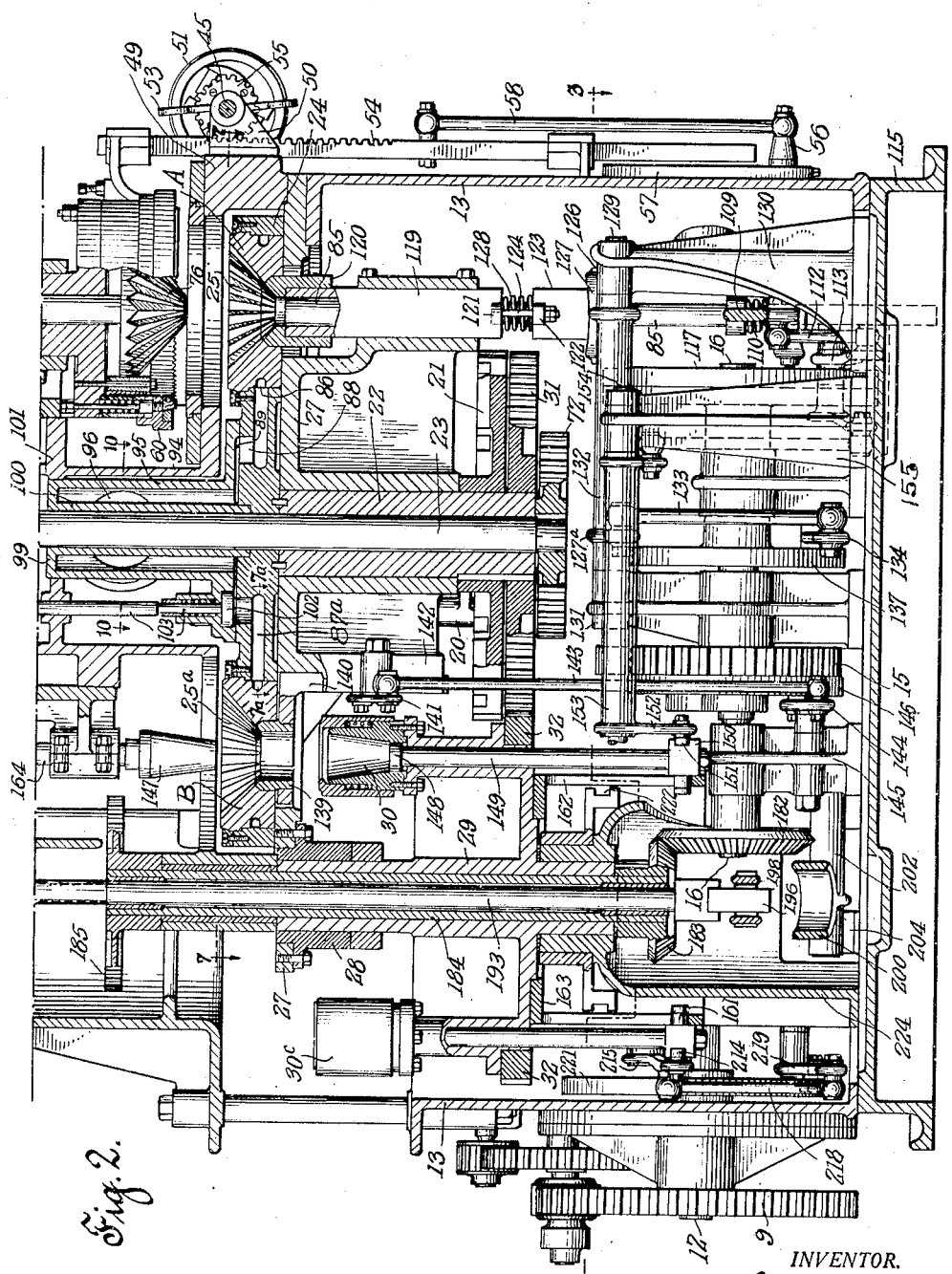
Figure 3:
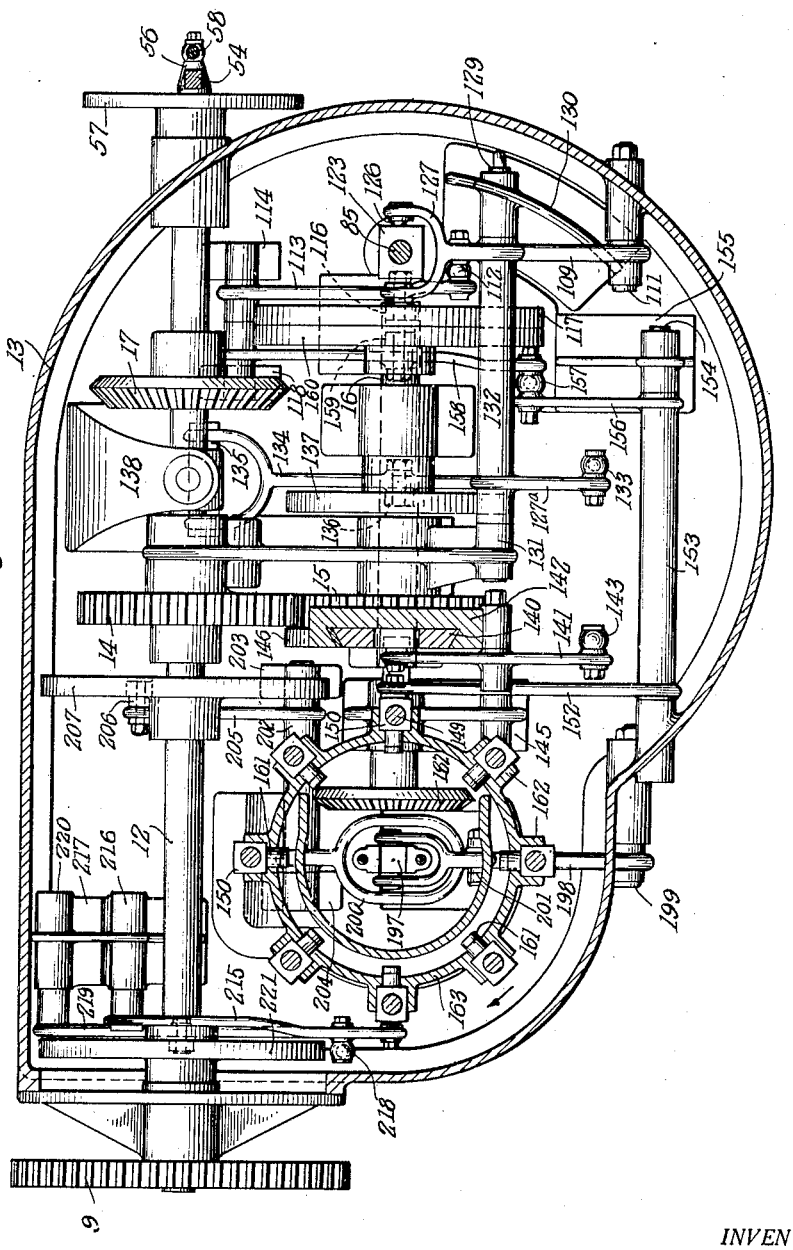
Figure 4:
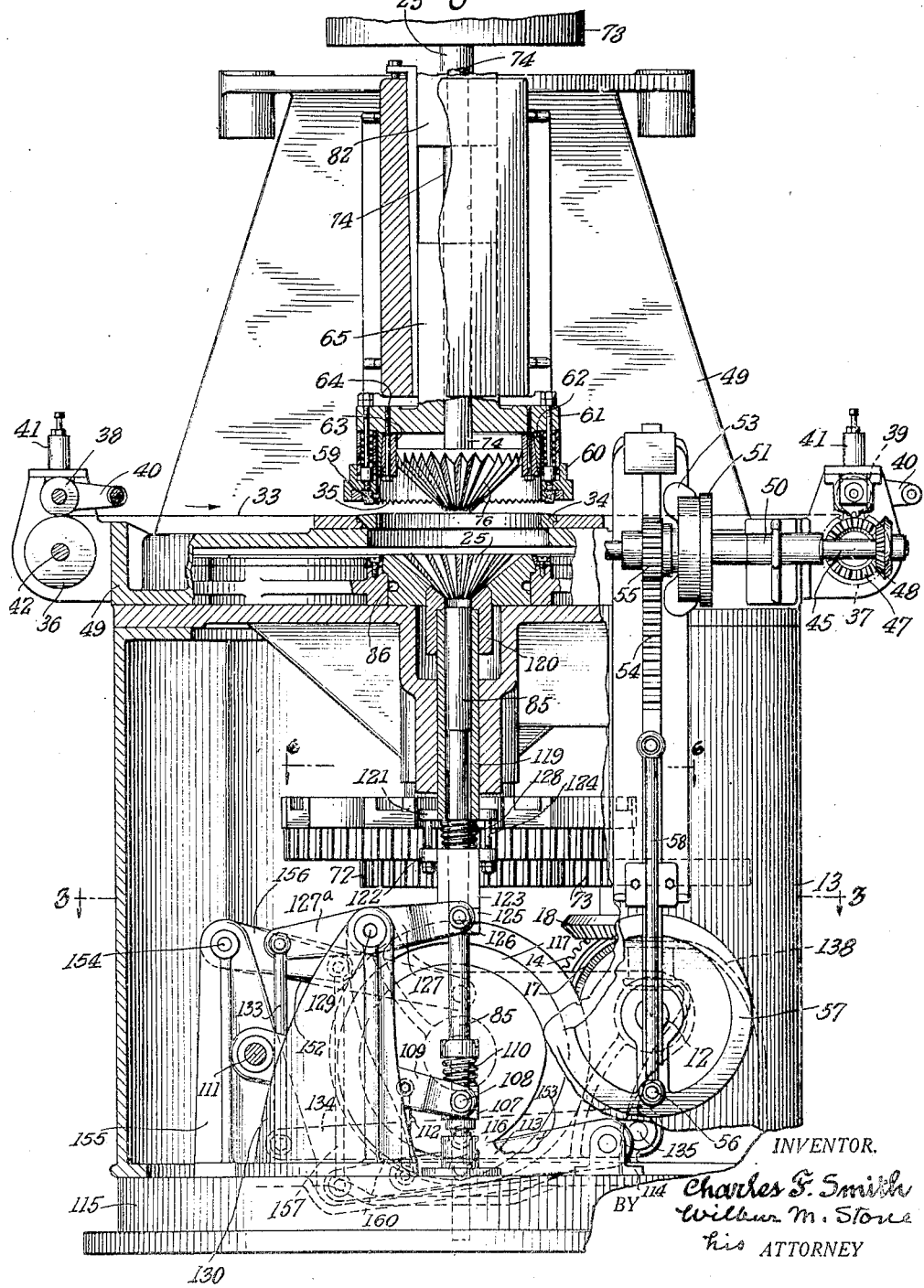
Figure 5:
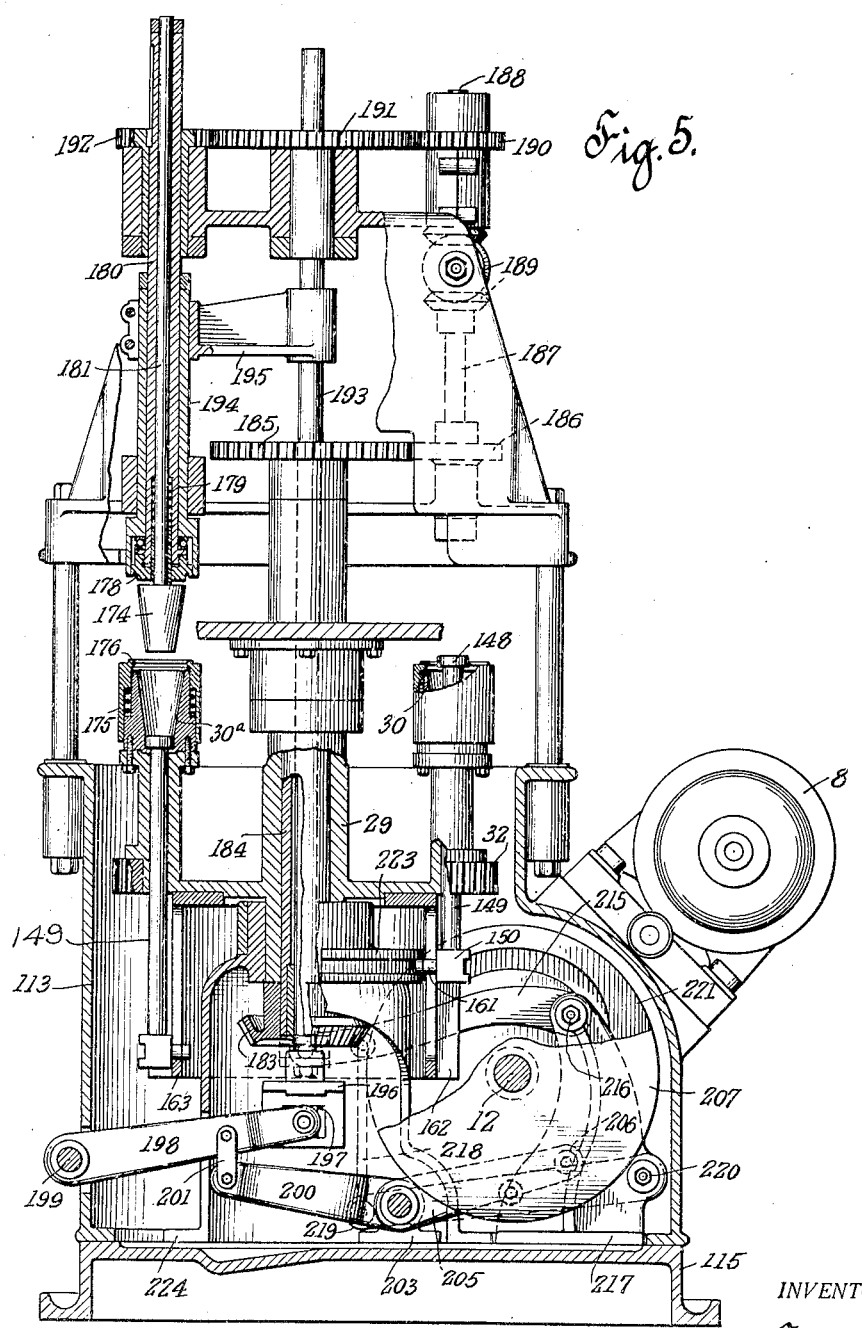
Figure 8:
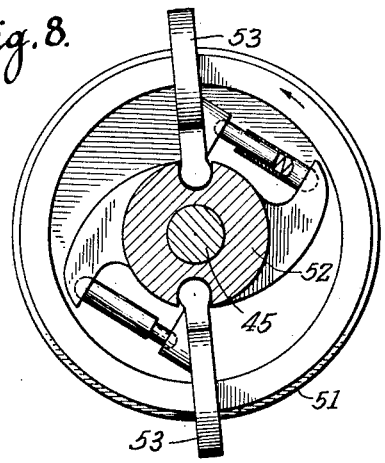
Figure 12:
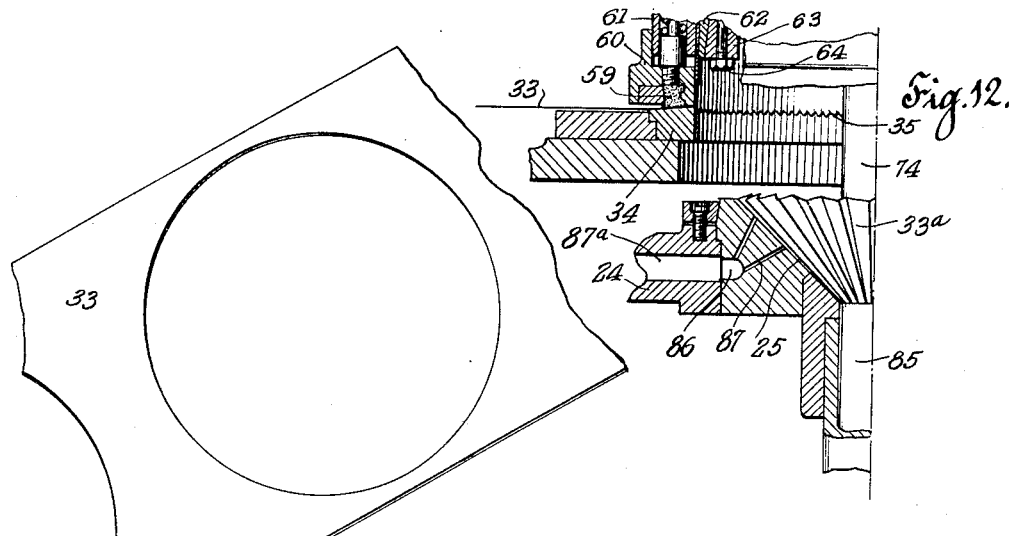
Figure 13:
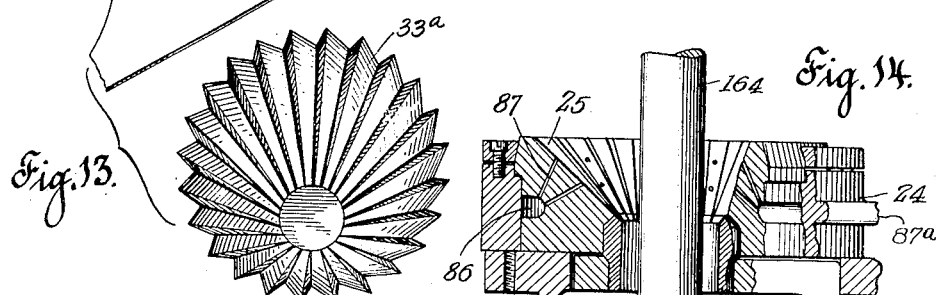
Figure 14:
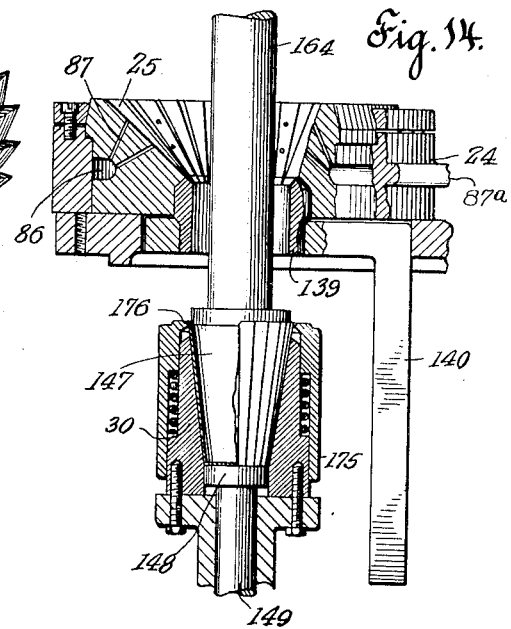
Figure 15:
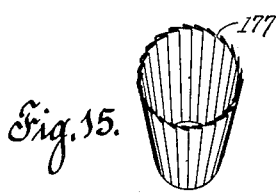
Figure 17:
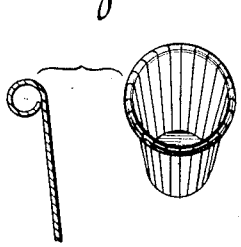
Figure 16:
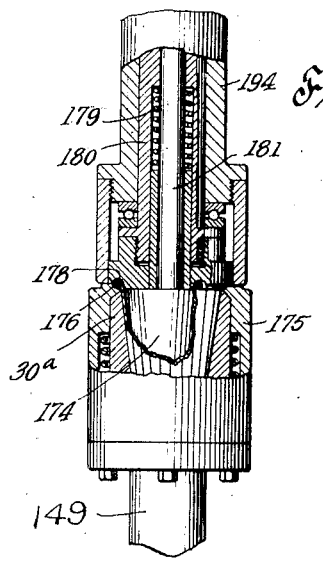
Figure 19:
Figure 18:
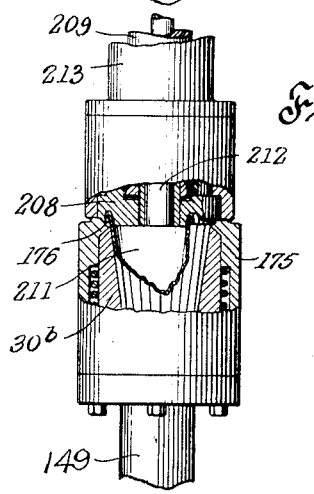

To these ends and others which will appear hereinafter, my improvements comprise features shown in their preferred embodiment in the drawings accompanying this specification wherein Figure 1 is a general plan view of my improved machine. Fig. 2 is a vertical section on line 2—2 of Fig. 1 and showing the lower portion of the machine. Fig. 2ª is a similar vertical section showing the upper portion of the machine, said Fig. 2ª in connection with Fig. 2 showing a complete vertical section of the machine. Fig. 3 is a horizontal section on 3—3 of Figs. 2 and 4. Fig. 4 is an end elevation, partly in section on line 4—4 of Fig. 1 and looking toward the right in Fig. 3 with part of the upright casing broken away. Fig. 5 is a vertical section on line 5—5 of Fig. 1. Fig. 6 is a fragmentary plan, partly in section on line 6—6 of Fig. 4. Fig. 7 is a plan of the first forming head with those parts above line 7—7 of Fig. 2 removed and with a portion shown in section on line 7ª—7ª in said Fig. 2. Fig. 8 is an end view of the friction drive, shown in section in Fig. 9, for the web of paper from which the cup blanks are cut. Fig. 10 is a horizontal section of the suction head on line 10—10 of Fig. 2. Fig. 11 is a vertical section on line 11—11 of Fig. 10. Fig. 12 is a half sectional elevation of the blank cutting mechanism and the first forming die. Fig. 13 is a plan view of a portion of the paper web from which the cup blanks are cut and one of the blanks after the first forming operation. Fig. 14 is a vertical section of a portion of what is shown to a smaller scale near the middle of Fig. 2. Fig. 15 is a perspective view of a cup as partly formed by the mechanism of Fig. 14. Fig. 16 is a fragmentary elevation, partly in section, showing the mechanism for turning over the top edge of the cup as shown in Fig. 17. Fig. 18 is a view similar to that of Fig. 16 showing the mechanism for completing the cup rim as shown in Fig. 19.

Figure 9:
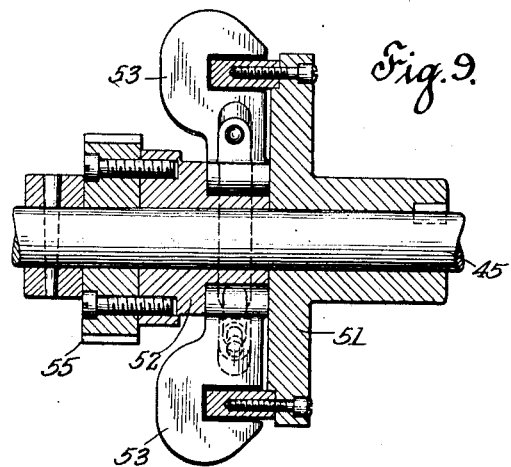
Figure 10:
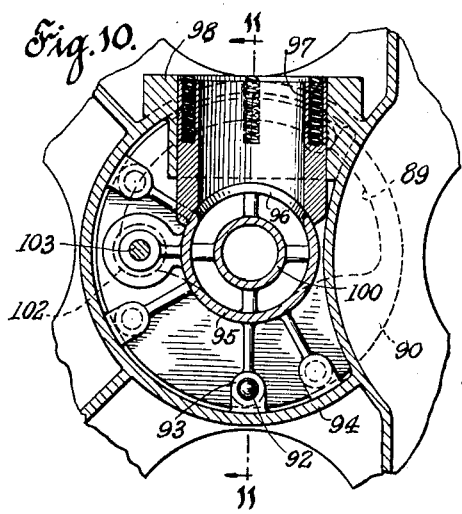
Figure 11:
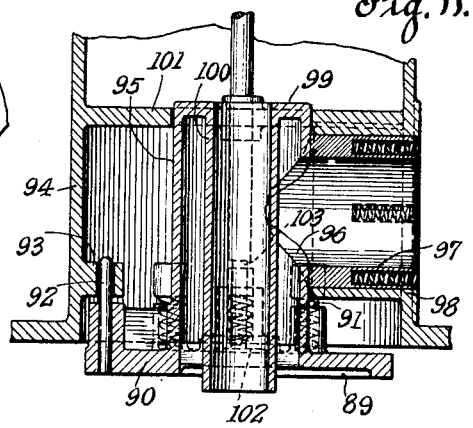

The scale of Figs. 1 to 7 inclusive is the same; that of Figs. 8 and 9 is three times the scale of Figs. 1 to 7 and that of Figs. 10 and 11 is one and one half times that of said early figures. The scale of Figs. 12 to 16 and 18 is twice that of Figs. 1 to 7.

While my improved machine is an organized unit for the purpose specified, for analysis and description it may be conveniently considered as comprising a plurality of sub-mechanisms such as web feeding, blank cutting and first forming, final body forming, top edge turning, top edge finishing, ejecting.

The machine comprises two intermittently rotating heads, each having a plurality of circumferentially arranged dies, the partly formed cup being transferred at one time from a die in the first head to a die in the second head and in which second head die it remains until completed and then is ejected upwardly therefrom. These heads rotate on vertical axes and the paths of the dies of the two heads overlap and at one time a die of the first head comes to rest over a die of the second head at the same time at rest, and at which time the partly formed cup is transferred downwardly from die to die.

The machine may be conveniently driven from an electric motor 8, through reducing gearing, to large gear 9 fixed to one end of horizontal shaft 12. Said shaft extends through casing 13 at each end, Fig. 3, and about midway its length has fixed thereto gear 14 meshing with and driving equal gear 15 fixed to shaft 16. Miter gear 17 fixed to shaft 12 Figs. 3 and 6, drives miter gear 18 fixed to vertical shaft 19. To said shaft 19 is fixed crank-pin 20 for driving intermittently, Geneva wheel 21 fixed to sleeve 22 about vertical shaft 23. To the upper end of said sleeve is fixed large head 24 in which are mounted circumferentially a plurality of initial forming dies as 25. For convenience eight such dies are employed and Geneva wheel 21 is provided with an equal number of radially arranged crank-pin engaging slots, as 26, Fig. 6. Sleeve 22 has its bearing in frame plate 27 supported by casing 13.

Said plate extends to the left, Fig. 2 and provides a support for the upper bearing 28 of the second intermittently rotating head 29, in which are carried the eight cup finishing dies as 30. Said second head 29 is rotated from gear 31 fixed to sleeve 22 meshing with and driving equal gear 32 fixed to said head 29.

*Web feeding.*—The web of paper 33, Fig. 4, from which the circular cup blanks are punched, is preferably fed intermittently from left to right in said Fig. 4, from some known source of supply not shown. Two pairs of feed rolls are arranged at opposite sides respectively of the machine, convenient to advance the paper over die 34 and under punch 35. Lower feed rolls 36, 37, Fig. 1 may be driven at the same speed but preferably roll 37 is driven at a speed slightly in excess of the speed of roll 36, to keep web 33 taut. Upper rolls 38, 39 are driven from their respective lower rolls by the usual gearing and said upper rolls are preferably mounted to lift off from their coacting lower rolls by cam lever devices, as 40, of known character, so that the web of paper may be conveniently threaded through. Spring tension between the respective pairs of rolls may be had by known means contained in hoods as 41, over the bearing of roll 38. At one end of shaft 42 of roll 36 is fixed miter gear 43 meshing with and driven by similar gear 44 fixed to the adjacent end of horizontal shaft 45. Shaft 46 of lower roll 37 has miter gear 47 fixed thereto, meshing with and driven by miter gear 48 fixed to that end of shaft 45 opposite gear 44.

On top of frame plate 27 is fixed top frame 49 from which bearings 50, 50 project to the right, Figs. 1 and 2, and in which bearings said shaft 45 turns. This shaft is rotated intermittently in anti-clockwise direction, Fig. 2, through clutch 51, shown in detail in Figs. 8 and 9. Said clutch is keyed to shaft 45 and member 52 turns freely on said shaft and carries opposite dogs 53, 53 for engagement with the rim of clutch 51. These dogs are pivoted in member 52 and spring urged. Said member 52 is rotated alternately in opposite directions by reciprocating rack 54, Figs. 1 and 2, in engagement with gear 55 fixed to member 52. When said dogs are driven anti-clockwise, Fig. 8, they grip the rim of clutch 51 and rotate that clutch and shaft 45. When said dogs are driven clockwise said dogs release and rotate idly. Rack 54 is reciprocated vertically from crank pin 56 in disc 57, fixed to the end of shaft 12, Figs. 3 and 4, and said crank pin is connected with said rack by link 58.

*Blank cutting and first forming.*—The web of paper 33 is advanced intermittently over die 34 and in each of its periods of rest a circular blank is cut therefrom by the descent of punch 35, Figs. 2, 4 and 12. Said punch is preceded in its downward movement by presser-foot 59 which has an angular face corresponding with a similar face of die 34, so that the coaction of the die face and presser-foot tends to stretch the paper taut over the die. Said presser-foot is preferably of rubber and is carried by spring pressed ring 60 slidable vertically on punch head 61. Punch 35 preferably comprises an annular ring of sheet steel the lower and cutting edge of which is preferably serrated. Said punch is held in head 61 by a pair of coacting conical faced rings 62, 63, the outer one of which may be split for expansion and the inner one of which may be drawn upward by bolts as 64.

Punch head 61 terminates upwardly in rectangular slide 65 having its bearing in the upper portion of top frame 49, Figs. 2$^a$ and 4. Said slide is actuated from constantly rotating vertical shaft 23 through miter gears 66, 67 and crank shaft 68. Said crank shaft 68 has crank pin 69 engaging block 70 in slot 71 transverse said slide 65. Shaft 23 has gear 72 fixed thereto meshing with and driven by equal gear 73 fixed to shaft 19, Figs. 2, 4 and 6.

For the first forming of the cup blank shaft 74 is mounted for vertical reciprocation in slide 65, concentric with punch 35. Said shaft is held against rotation by key 75, Fig. 2$^a$. To the lower end of said shaft is fixed a fluted conical former 76 for coaction with a similarly fluted die 25 below. The flutings of said former and die are of saw-tooth character so as to form in the paper disc therebetween any given fold longer than its opposite adjacent folds, so that the resultant plaits in the cup body will fold all one way, see Fig. 13. For reciprocating shaft 74 cam 77 is fixed to shaft 23 near the upper end thereof, Figs. 1, 2$^a$ and 4. Lever 79 has one of its yoked ends pivoted at 80 to an ear of top frame 49 and its other yoked end pivoted to opposite transverse slides in sleeve 81. Said sleeve is slidably mounted in the upper end of block 82 slidably mounted above slide 65, in the upper part of the same bearing. Sleeve 81 is normally maintained in position relatively to block 82 by spring 83, about the reduced upper end of shaft 74. Lever 79 about midway its length has cam roll 84 in engagement with the circumferential groove 78 in cam 77, Fig. 1. As slide 65, having on its lower end punch 35 and shaft 74 having on its lower end plunger 76 are actuated from the same shaft 23, their relative timing is predetermined and said former 76 descends directly after punch 35 has cut a blank from the web, and which cutting is shown completed in Fig. 12.

But, that said blank may remain always in control, just before said punch descends, lower plunger 85 ascends and clamps the paper web against the bottom of former 76.

Then, after punch 35 in coaction with die 34, has cut a circular blank from web 33, former 76 descends pushing the paper disc and lower plunger 85 before it, said disc being formed into a fluted conical dish 33ª between the former and die, Fig. 12.

For retaining said paper dish 33ª in die 25, suction means are provided. Around the outside of said die is channel 86 and from said channel a plurality of ducts as 87 communicate with the interior of said die. Head 24, in which said die 25 and the others of its kinds are arranged circumferentially for rotation with said head, is provided with a plurality of radial channels as 87ª, best shown in Figs. 2, 12, 14 and in the section of Fig. 7 which is taken on line 7ª—7ª of Fig. 2. Said channels 87ª communicate on the one hand with said die channels, as 86, and on the other hand, by means of vertical vents 88 with chamber 89 in the bottom of shoe 90. To keep the surface joint between shoe 90 and the upper face of the midportion of head 24 approximately airtight said shoe is pressed downwardly by springs as 91, Fig. 11. Also to constrain shoe 90 to vertical movement only, pin 92 slidable in ear 93 of casing 94, serves. Said casing is an upward extension of top frame 49. Shoe 90 has upwardly reaching air chamber 95 which has port 96 at the rear thereof, Fig. 2, shown in detail in Figs. 10 and 11, communicating through sleeve 97 with some known means of exhaust not shown. Said sleeve 97 slides within shell 98, to which piping to the source of exhaust may be attached, and said sleeve 97 is spring urged against air chamber 95 to prevent leakage. Said air chamber has head 99 from which extends downwardly sleeve 100 as a bearing for shaft 23. The upper end of air chamber 95 extends through an opening in transverse wall 101 of casing 94.

For shutting off the suction from successive vertical vents 88, as each of dies 25 reaches discharge position 25ª, Fig. 2, vertical reciprocating valve 102 is provided. Said valve is fixed to the lower end of stem 103, Figs. 2 and 2ª and is governed by cam 104 fixed to vertical shaft 23. Dog 105 fixed to said stem 103 engages said cam and is urged thereto by spring 106.

Reverting now to lower plunger 85, Figs. 2, 3 and 4, said plunger is encircled near its lower end by slidable block 107, into opposite slots whereof project pins, as 108, from the opposite ears of the yoked end of lever 109. Said block lies between opposite collars fixed to said plunger and is urged against the lower collar by spring 110 between said block and the upper collar. Lever 109 is pivoted at 111 on an ear extending inwardly from the curved end of casing 13, Fig. 3. Said lever 109 is connected by link 112 with the free end of lever 113 pivoted in brackets 114 and 118 on base 115. Said lever 113 carries about midway its length, roll 116 in engagement with the cam groove of cam 117 fixed to the end of shaft 16. When plunger 85 is elevated, by the means just described, to coaction with the lower end of former 76 to grip the paper disc, spring 110 is slightly compressed, whereby said plunger is held to its work by yielding pressure.

About plunger 85 is sleeve 119 terminating upwardly in die base 120. Said base 120 is of corrugated cup shape at its upper end, forming with die 25 a complete form for fluting the paper disc. Said base 120 further acts as a locking plug for positioning and holding in accurate relation with former 76, rotatable head 24. Said sleeve 119 terminates downwardly in opposite ears, as 121, which are adjustably connected to similar ears, as 122, of slidable block 123 by bolts, as 124. Said block 123 encircles plunger 85 and is provided with opposite transverse slots as 125 into which project pins, as 126, from opposite ears of the yoked end of lever 127. Between the lower end of sleeve 119 and the upper end of block 123 is interposed spring 128, so that, as block 123 is raised its full stroke, sleeve 119 and die base 120 are yieldably supported. Lever 127 is pivoted on shaft 129 supported between brackets 130 and 131 upstanding from base 115. Lever 127 is fixed to the right hand end of sleeve 132, Fig. 3, and to the other end thereof lever 127ª projects in a direction opposite to that of lever 127. The free end of lever 127ª is connected by link 133 with the free end of lever 134. Said lever 134 is pivoted at 135 in the lower part of bracket 138. About midway its length lever 134 has roll 136 in engagement with the groove of cam 137 fixed to shaft 16.

As former 76 descends into coaction with die 25, whereby the paper disc is formed into a conical fluted dish shape, the suction in die channel 86 retains the paper dish in said die. Former 76 then retires upwardly to the position of Fig. 4 and die base 120 is withdrawn downwardly, unlocking large head 24, which thereupon rotates in a plurality of incremental movements through a half revolution, carrying die 25 from position A, Figs. 2 and 7, to position B, when the fluted dish shaped paper blank is in position to be delivered to one of the final body forming dies as 30 of the second rotating head 29, Fig. 2.

*Final body forming.*—At station B, to provide a temporary hollow bottom for die 25ª as a substitute for die base 120, which has been left at station A, die base 139 is provided. Said base 139 is carried by vertically movable slide 140 which is actuated in suitable timing as follows: Lever 141 is pivoted midway its length on bearing box 142 of slide 140, and has one end thereof coupled by a short link to said slide. The other end of said lever is connected by link 143 with rock lever 144 pivoted in a bracket of bearing 145 of shaft 16, Figs.

2 and 3. The other end of said rock lever 144 has a roll in engagement with the cam groove of cam 146.

In its inoperative position, above die 25ª at station B, Fig. 2, is tapered plug 147, and below said die is final forming die 30, fixed to second intermittently rotatable head 29. Said die 30 is provided with false bottom comprising head 148 on the upper end of reciprocatable stem 149. Said stem and head are lifted at suitable times by the following means. To the lower end of said stem 149 is fixed block 150 having a transverse slot through its right hand side, Fig. 2, which is engaged by roll 151 on the free end of arm 152 of sleeve 153 turning on shaft 154 supported in upstanding brackets as 155. Arm 156, also fixed to sleeve 153, is connected by link 157 with the free end of lever 158 pivoted between ears 114 and 118, Fig. 3. About midway its length said lever 158 bears roll 159 in engagement with the cam groove of cam 160 fixed to shaft 16. Block 150 of stem 149 slides between guides as 162, Figs. 3 and 5, and roll 161 projects inwardly from said block, through frame 163, fixed to the lower face of the flange of rotating head 29, for purposes presently to be explained.

Directing attention now to plug 147, the following means are provided for reciprocating that plug to push the fluted dish shaped blank through die 25ª and into forming die 30. Said plug is fixed to the lower end of plunger 164, Figs. 2 and 2ª and, slidably mounted on the upper end of said plunger between collars 165, 166 is block 167 having opposite slots for the engagement of pins as 168 of the yoked end of lever 169. The other end of said lever 169 is pivoted to ear 170 of top frame 49. Midway its length said lever has roll 171 in engagement with the cam groove of cam 172 fixed to vertical shaft 23. To permit plug 147 to operate yieldably in coaction with plunger head 148, spring 173, Fig. 2ª, is interposed between block 167 and collar 166. As plug 147 starts to descend, head 148 rises and the midportion of the partly formed paper blank is clamped between them and thereby centered for descent into die 30. At the same time valve 102 descends and cuts off the suction from die 25ª thereby releasing the paper blank. In Fig. 14 the cup, with its sides in final formation, is shown seated in die 30, plug 147 filling the cup and head 148 in contact with the cup bottom below. The cup as formed by said die and plug is shown in Fig. 15.

After the just described operation, plug 147 retires upwardly to the position of Fig. 2, die base 139 is withdrawn downwardly, simultaneously with the withdrawal of die base 120, unlocking head 24 and therefore second head 29. These heads thereupon are rotated and by two incremental movements die 30 is brought to position 30ª, Fig. 5, under plug 174 similar to plug 147. As head 29 and frame 163 rotate in clockwise direction, Figs. 1 and 3, block 150 rotates out of engagement with roll 151 of lever 152, Fig. 2; and after said head has made a half rotation to the position of die 30ᶜ, said block 150 has rotated into engagement with roll 214 of lever 215 at the left hand of Fig. 2, for purposes presently to be described.

*Top edge turning.*—Die 30 is surrounded by sleeve 175, spring supported and terminating upwardly in an inreaching flange 176 over which the edge 177 of the cup mouth, Fig. 15, is adapted to be turned by upper rim die 178, Figs. 5, 14 and 16. Plug 174 is fixed to the lower end of plunger 181 and is yieldable upwardly against spring 179 within sleeve 180, to the lower end of which rim die 178 is fixed. Said sleeve and die are rotated to roll over the cup flange by the following means: Bevel gear 182 fixed to the left hand end of shaft 16, Figs. 2 and 3, meshes with and drives bevel gear 183 fixed to the lower end of central vertical sleeve 184. To the upper end of said sleeve is fixed gear 185 meshing with and driving gear 186 fixed to the lower end of shaft 187. From said shaft 187 motion in reverse direction is transmitted to shaft 188 above and in line therewith, through the three miter gears 189. Fixed to the upper end of shaft 188 gear 190, through intermediate central gear 191, drives gear 192 within the hub of which is slidably keyed sleeve 180. Said sleeve 180, die 178 and plug 174 are reciprocated vertically for coaction with die 30ª through central plunger 193, Figs. 2 and 5, and which plunger is connected with slidable casing 194 by arm 195. Said casing 194 surrounds sleeve 180 and said sleeve is free to rotate within said casing but is constrained against endwise movement relatively thereto. To the lower end of plunger 193 is fixed block 196 terminating downwardly in a narrowed portion in which is mounted for slight transverse movement slide 197. To opposite sides of said slide is pivoted the opposite ears of the yoke end of lever 198. Said lever is pivoted at 199 in casing 13 and about midway its length is connected to lever 200 therebelow by links as 201. Said lever 200 has an opening in its mid-portion for the entrance of blocks 197 in its downward movement and is fixed to sleeve 202 pivoted between ears 203, 204 on base 115. Also fixed to sleeve 202 and reaching in a direction opposite to that of lever 200 is lever 205 carrying at its free end roll 206 for engagement with the cam groove of cam 207, Fig. 3. The action of die 178, by the means just described, in its operation of rolling over the edge of the cup mouth is clearly shown in Fig. 16 and the resultant effect in Fig. 17.

*Top edge finishing.*—At the next incremental move of head 29 die 30 is brought to position 30ᵇ, Figs. 1 and 18, where another upper mechanism, very similar to that above die 30 at position 30ª, is located. Upper die 208 is fixed to the lower end of sleeve 209 and to the upper end of said sleeve gear 210 is slidably keyed, and said gear is driven by central gear 191, Fig. 1. Plug 211 is fixed to the lower end of plunger 212. Casing 213 surrounding sleeve 209 is clamped within one portion of the bifurcated end of arm 195 and is reciprocated thereby, Figs. 1 and 5. Said upper die 208 is efficient, in coaction with inreaching flange 176 of sleeve 175, for flattening down the cup flange against the body of the cup, Figs. 18 and 19.

*Ejecting.*—At the next incremental movement of head 29 die 30 is brought to position 30ᶜ, Figs. 1 and 2, where the finished cup is ejected upwardly by head 148 of stem 149 and may be conducted away from the machine by means not shown. Block 150 of said stem is now in control of roll 214 on the free end of lever 215, Figs. 2 and 3. Said lever is pivoted in ear 216 of bracket 217 and by link 218 is connected to lever 219 therebelow. Said lever 219 is pivoted at 220 in bracket 217 and has its cam roll in engagement with the cam groove of cam 221 fixed to shaft 12.

After having been lifted to eject the cup, and in its next incremental movement, block 150 passes out of control of roll 214 of lever 215 and roll 161 of said block passes into track 222 of semi-circular guide 223 fixed to the upper portion of casing 224. Said guide maintains control of said block 150, stem 149 and ejector head 148, keeping said head in elevated position, Fig. 5, until head 29 is rotated to its initial blank receiving position where control is again transferred to roll 151 of lever 152, by which lever said head is further elevated to coact with plunger 147, to grip a fresh dished blank as previously described. The cycle of operations is thus completed.

I claim:

1. In a paper cup machine the combination of an intermittently rotating head, a plurality of dish shaped, fluted, open bottomed dies circumferentially arranged in said head, and a hollow, fluted faced, vertically slidable die base adapted and actuated to enter successively the open bottoms of said dies, supplementing the fluted contour of said dies and temporarily locking said head against turning.

2. In a paper cup machine the combination of a punch and die, intermittently operating means for feeding a web of paper between said punch and die, an intermittently rotating head, a plurality of dish shaped, fluted, open bottomed dies circumferentially arranged in said head, a hollow, fluted faced, vertically slidable die base adapted and actuated to enter successively the open bottoms of said dies, supplementing the fluted contour of said dies and temporarily locking said head against turning, a fluted, conical former above said rotating head, means for reciprocating said former into successive coacting relation with said dies, a yieldable plunger below said die base adapted and actuated to rise through said die base and clamp the paper web against the lower face of said former, and means for actuating said punch after the paper web is clamped.

3. In a paper cup machine the combination of a dish shaped, fluted, open bottomed die, a hollow, fluted faced, vertically slidable die base adapted and actuated to enter the open bottom of said die, supplementing the fluted contour thereof, and a fluted, conical former above said die, means for reciprocating said former into coacting relation with said die, means for supplying a circular paper blank below said former, and a yieldable plunger below said die base adapted and actuated to rise through said die base and clamp the paper blank against the lower face of said former.

4. In a paper cup machine the combination of a punch and die, intermittently operating means for feeding a web of paper between said punch and die, an intermittently rotating head, a plurality of dish shaped, fluted, open bottomed dies circumferentially arranged in said head, a hollow, fluted faced, vertically slidable die base adapted and actuated to enter successively the open bottoms of said dies, supplementing the fluted contour of said dies and temporarily locking said head against turning, a fluted, conical former above said rotating head, means for reciprocating said former into successive coacting relation with said dies, a yieldable plunger below said die base adapted and actuated to rise through said die base and clamp the paper web against the lower face of said former, and means for actuating said punch after the paper web is clamped, said conical former reciprocating means being effective after said punch action, in connection with said yieldable plunger to carry the blank punched from the web into the die therebelow.

5. In a paper cup machine the combination of an intermittently rotating head, a plurality of dish shaped, fluted, open bottomed dies circumferentially arranged in said head, a hollow, fluted faced, vertically slidable die base adapted and actuated to enter successively the open bottoms of said dies, supplementing the fluted contour of said dies and temporarily locking said head against turning, a fluted, conical former above said rotating head, means for reciprocating said former into successive coacting relation with said dies, means for supplying a circular paper blank below said former, a yieldable plunger below said die base adapted and actuated to rise through said die base and clamp the paper blank against the lower face of said former, said conical former reciprocating means being effective in connection with said yieldable plunger to carry the blank into the die thereblow, and suction means for retaining the paper blank in said die.

6. In a paper cup machine the combination of an intermittently rotating head, a plurality of dish shaped, fluted, open bottom dies circumferentially arranged in said head, a hollow, fluted faced, vertically slidable die base adapted and actuated to enter successively the open bottoms of said dies, supplementing the fluted contour of said dies and temporarily locking said head against turning, a fluted, conical former above said rotating head, means for reciprocating said former into sucessive coacting relation with said dies, means for supplying a circular paper blank below said former, and suction means for retaining the paper blank in said die.

7. In a paper cup machine the combination of an intermittently rotating head, a plurality of cup body forming dies circumferentially arranged on said head, a body forming plug mounted and actuated for vertical reciprocation above the receiving position of said forming dies, a vertically reciprocatable stem having a head, in each of said body forming dies, said head serving as a die bottom, means for reciprocating said stem at the receiving position of said forming dies, means for delivering a dish shaped paper blank between said plug and a forming die therebelow, said stem being actuated to rise for coaction with said plug for gripping the paper blank therebetween and said plug being actuated to descend, following said stem, for delivering the paper blank into the forming die.

8. In a paper cup machine the combination of a dish shaped, fluted, open bottomed die, a hollow, fluted faced, vertically slidable die base adapted to enter the open bottom of said die, supplementing the fluted contour of said die, means for seating a circular paper blank in said dish shaped die, suction means for retaining the paper blank in said die, a cup body forming die, means for moving said dish shaped die into coacting relation with and above said cup body forming die, a second hollow, vertically slidable die base adapted and actuated to enter the open bottom of the dish shaped die, means for delivering the paper blank through the dish shaped die and die base into said body forming die therebelow, and means for shutting off the suction from the dish shaped die.

9. In a paper cup machine the combination of an intermittently rotating head, a plurality of dish shaped, fluted, open bottomed dies circumferentially arranged in said head, a hollow, fluted faced, vertically slidable die base adapted and actuated to enter successively the open bottoms of said dies, supplementing the fluted contour of said dies and temporarily locking said head against turning, means for seating a circular paper blank in one of said dish shaped dies, suction means for retaining the paper blank in said die, a second intermittently rotating head timed with said first mentioned rotating head, a plurality of cup body forming dies circumferentially arranged on said second head, adapted and actuated to rotate into coacting relation with and below the dish shaped dies of said first mentioned head, respectively, a second hollow, vertically slidable die base adapted and actuated to enter successively the open bottoms of the dish shaped dies of the first mentioned rotating head, said second slidable die base being located remote from said first mentioned slidable die base and above the receiving position of said forming dies, means for delivering the paper blank through the dish shaped die and die base into a body forming die therebelow, and means for shutting off the suction from the dish shaped die.

10. In a paper cup machine the combination of an intermittently rotating head, a plurality of cup body forming dies circumferentially arranged on said head, a body forming plug mounted and actuated for vertical reciprocation above the receiving position of said forming dies, a yieldable sleeve about each of said forming dies, said sleeve having an upper inreaching flange, and a rotating rim die above and movable with said plug for turning over the rim of a cup.

11. In a paper cup machine the combination of an intermittently rotating head, a plurality of cup body forming dies circumferentially arranged on said head, a body forming plug mounted and actuated for vertical reciprocation above the receiving position of said forming dies, a vertically reciprocatable stem having a head, in each of said body forming dies, said head serving as a die bottom, means for reciprocating said stem at the receiving position of said forming dies, means for delivering a dish shaped paper blank between said plug and a forming die therebelow, said stem being actuated to rise for coaction with said plug for gripping the paper blank therebelow, said plug being actuated to descend, following said stem, for delivering the paper blank into the forming die, a yieldable sleeve about each of said forming dies, said sleeve having an upper inreaching flange, and a rotating rim die above and movable with said plug for turning over the rim of a cup.

12. In a paper cup machine the combination of an intermittently rotating head, a plurality of cup body forming dies circumferentially arranged on said head, a body forming plug mounted and actuated for vertical reciprocation above the receiving position of said forming dies, a yieldable sleeve about each of said forming dies, said sleeve having an upper inreaching flange, a rotating rim die above and movable with said plug for turning over the rim of a cup, a second plug mounted and actuated for vertical reciprocation above a position of said dies subsequent to their receiving position, and a second rotating rim die above and movable with said second yieldable plug for flattening the turned over cup rim against the cup.

13. In a paper cup machine the combination of an intermittently rotating head, a plurality of cup body forming dies circumferentially arranged on said head, a body forming plug mounted and actuated for vertical reciprocation above the receiving position of said forming dies, a vertically reciprocatable stem having a head, in each of said body forming dies, said head serving as a die bottom, means for reciprocating said stem at the receiving position of said forming dies, means for delivering a dish shaped paper blank between said plug and a forming die therebelow, said stem being actuated to rise for coaction with said plug for gripping the paper blank therebetween, said plug being actuated to descend, following said stem, for delivering the paper blank into the forming die, a yieldable sleeve about each of said forming dies, said sleeve having an upper inreaching flange, a rotating rim die above and movable with said plug for turning over the rim of a cup, a second yieldable plug mounted and actuated for vertical reciprocation above a position of said dies subsequent to their receiving position, and a second rotating rim die above and movable with said second yieldable plug for flattening the turned over cup rim against the cup.

14. In a paper cup machine the combination of an intermittently rotating head, a plurality of cup body forming dies circumferentially arranged on said head, a body forming plug mounted and actuated for vertical reciprocation above the receiving position of said forming dies, a vertically reciprocatable stem having a head, in each of said body forming dies, said head serving as a die bottom, releasably connected means for reciprocating said stem at the receiving position of said forming dies, means for delivering a dish shaped paper blank between said plug and a forming die therebelow, said stem being actuated to rise for coaction with said plug for gripping the paper blank therebetween, said plug being actuated to descend, following said stem, for delivering the paper blank into the forming die, means for turning over the rim of a cup, and releasably connected means for reciprocating said stem for discharging a cup from a die.

15. In a paper cup machine the combination of an intermittently rotating head, a plurality of cup body forming dies circumferentially arranged on said head, a body forming plug mounted and actuated for vertical reciprocation above the receiving position of said forming dies, a vertically reciprocatable stem having a head, in each of said body forming dies, said head serving as a die bottom, releasably connected means for reciprocating said stem at the receiving position of said forming dies, means for delivering a dish shaped paper blank between said plug and a forming die therebelow, said stem being actuated to rise for coaction with said plug for gripping the paper blank therebetween, said plug being actuated to descend, following said stem, for delivering the paper blank into the forming die, means for turning over the rim of a cup, means for flattening the turned over rim against the cup, and releasably connected means for reciprocating said stem for discharging a cup from a die.

16. In a paper cup machine the combination of an intermittently rotating head, a plurality of dish shaped open bottomed dies circumferentially arranged in said head, a vertically slidable die base adapted and actuated to enter successively the open bottoms of said dies, supplementing the contour of said dies, a second vertically slidable die base remote from said first mentioned die base, adapted and actuated to enter successively the open bottoms of said dies, said two die bases being timed to act in unison to temporarily lock said head against rotation.

In witness whereof, I hereby affix my signature, this 1st day of July, 1927.

CHARLES F. SMITH.